(12) United States Patent
Aggarwal et al.

(10) Patent No.: US 10,970,318 B2
(45) Date of Patent: Apr. 6, 2021

(54) ACTIVE CHANGE DETECTION FOR GEOSPATIAL ENTITIES USING TREND ANALYSIS

(71) Applicant: Apple Inc., Cupertino, CA (US)

(72) Inventors: Rakesh K Aggarwal, San Jose, CA (US); Robert M Schulman, Menlo Park, CA (US); Jayasurya S. Vadrevu, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 201 days.

(21) Appl. No.: 16/052,461

(22) Filed: Aug. 1, 2018

(65) Prior Publication Data

US 2020/0042620 A1    Feb. 6, 2020

(51) Int. Cl.
| | |
|---|---|
| G06F 16/29 | (2019.01) |
| G06F 16/25 | (2019.01) |
| G06F 16/28 | (2019.01) |
| G06F 16/22 | (2019.01) |
| G06F 16/23 | (2019.01) |
| G06F 16/9537 | (2019.01) |

(52) U.S. Cl.
CPC .......... *G06F 16/29* (2019.01); *G06F 16/2255* (2019.01); *G06F 16/2379* (2019.01); *G06F 16/258* (2019.01); *G06F 16/287* (2019.01); *G06F 16/9537* (2019.01)

(58) Field of Classification Search
CPC .. G06F 16/29; G06F 16/9537; G06F 16/2379; G06F 16/2255; G06F 16/20
USPC ......................................................... 707/740
See application file for complete search history.

(56) References Cited

U.S. PATENT DOCUMENTS

2011/0314144 A1* 12/2011 Goodman .............. G06Q 10/06
709/224
2018/0041871 A1* 2/2018 Su ......................... H04W 4/029

* cited by examiner

*Primary Examiner* — Hosain T Alam
*Assistant Examiner* — Tracy M McGhee
(74) *Attorney, Agent, or Firm* — Invoke

(57) ABSTRACT

In some implementations, a computing device can detect changes in map data based on device activity data received from a mobile device. For example, the device activity data can include location data that describes locations where the mobile devices have traveled, direction, speed, and/or other data. Based on the received location data, the computing device can determine whether stored map data for a particular area accurately reflects the real world characteristics of the particular area. The device activity data can identify user behavior with respect to the mobile device. For example, the characteristics of a real world geographic area may influence how users use their mobile devices (e.g., which applications are used) in the geographic area. The computing device can analyze the user behavior identified in the device activity data to detect changes in the real world characteristics of the geographic area.

21 Claims, 8 Drawing Sheets

ACTIVE CHANGE DETECTION FOR GEOSPATIAL ENTITIES USING TREND ANALYSIS

TECHNICAL FIELD

The disclosure generally relates to map data change detection and trend analysis.

BACKGROUND

Many users of mobile devices use software-based mapping applications executing on the mobile devices to navigate the physical world. For example, mobile device users may often use a mapping application to get driving directions from a starting location to a destination location. A mapping application often generates a virtual representation (e.g., a map) of a physical location or geographic area when providing navigation instructions to the user. Such a virtual representation or display is generated using a large amount of map data relating to and/or representing, for example, roads, speed limits, lanes, addresses, points of interest, landmarks, buildings, or the like.

Over time, the real world may change, and the map data may no longer accurately represent the real world. For example, a road may undergo construction and be reconfigured such that its physical state deviates considerably from its representation in the map data. Similarly, user activity in the real world may change. For example, users at a physical location may activate different mobile applications or access different wireless networks than previously identified at a given physical location. Detecting these changes and/or differences between the map data and the real world can be difficult, burdensome, time consuming, and expensive.

SUMMARY

In some implementations, a computing device can detect changes in map data based on device activity data received from a mobile device. For example, the device activity data can include location data that describes locations where the mobile devices have traveled, direction, speed, and/or other data. Based on the received location data, the computing device can determine whether stored map data for a particular area accurately reflects the real world characteristics of the particular area. The device activity data can identify user behavior with respect to the mobile device. For example, the characteristics of a real world geographic area may influence how users use their mobile devices (e.g., which applications are used) in the geographic area. The computing device can analyze the user behavior identified in the device activity data to detect changes in the real world characteristics of the geographic area.

Particular implementations improve map data quality and map product delivery systems. Some implementations enable map product delivery teams to determine whether map data should be employed as a production data set for use with mapping applications in mobile devices currently in use. Some implementations enable early detection of real world changes, thereby ensuring quicker updates to map data that is delivered to mobile devices. Map data for that location may be reconfigured or decommissioned until it aligns with the currently observed data. Thus, these implementations improve the mapping application user experience and also ensure that only map data meeting a certain standard is deemed safe enough for use by mobile devices being operated in moving vehicles.

Particular implementations also improve map data collection by enabling a much richer data capture scheme. This may be especially true when compared to a system of physical data capture that may require map data capture teams to actually drive through geographic areas to detect changes. In some implementations, activity data from mobile devices may provide a much more granular and accurate representation of user behavior at a geographic area. Moreover, these implementations capture application use data that map data capture teams may be unable to collect. This improves the accuracy and quality of map data change detection as one data type may be verified against several others to ensure that the correct map data changes are identified and implemented.

Particular implementations also improve additional aspects of the mapping application product as delivered to mapping application users. Where significant changes occur to the real world in a short period of time, users of mapping applications may not receive the most updated data on their devices. In some implementations, the computing device may be configured to receive currently observed data and quickly determine areas of high change so that map updates can be prioritized and fulfilled by map maintenance and change management teams with the least amount of inconvenience to users.

Particular implementations also improve the current state of the art with respect to computer-based mapping technology. In some implementations, the improvements result in changes to the physical world being detected more quickly. For example, a change in a road's direction, length, contours, or other characteristics may be determined more quickly using these implementations. Particular implementations also enable map product delivery teams to simply detect road changes without having to dispatch map data capture teams to drive over certain road segments. In addition, some implementations result in more accurate maps for end users, leading to fewer navigation routing errors and shorter delays. In addition, particular implementations reduce wastage of processing resources that are otherwise spent processing and transmitting faulty data that may later be reported to be erroneous. Moreover, some implementations reduce mapping software errors resulting from incongruities between the actual road and the road as expected or interpreted by the mapping software. This further improves the user experience and leads to greater engagement and usage with the mapping software.

Additionally, where the character of mobile device usage changes for a particular location, some implementations improve the mapping application's usage by enabling improved suggestions, such as for routes and access points to destinations such as points of interest and parking lots. For example, the computing device may detect that an area previously seeing a great deal of driving activity (as indicated by location data or application launch data) is now indicating higher walking activity (e.g., as indicated by slower movement speeds for mobile devices in the location data or by different applications being launched, such as health and fitness applications instead of navigation or vehicle-based entertainment applications).

Details of one or more implementations are set forth in the accompanying drawings and the description below. Other features, aspects, and potential advantages will be apparent from the description and drawings, and from the claims.

DESCRIPTION OF DRAWINGS

Like reference symbols in the various drawings indicate like elements.

DETAILED DESCRIPTION

Figure 1:
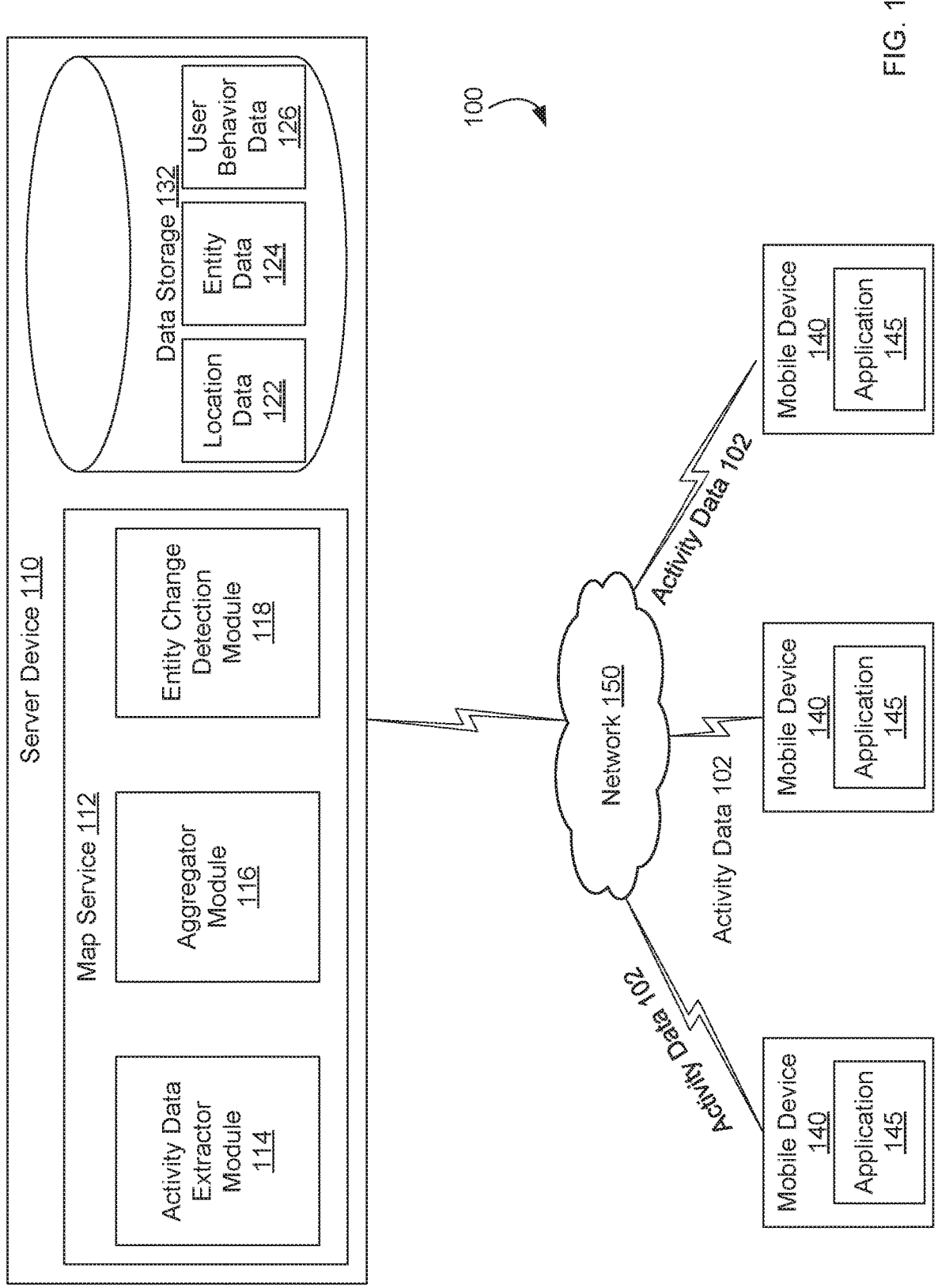
FIG. 1 is a block diagram of an example system for active change detection for geospatial entities using trend analysis.

FIG. 1 is a block diagram of an example system 100 for active change detection for geospatial entities using trend analysis. For example, system 100 can correspond to a change detection system that provides an operator of server device 110 the ability to analyze, verify, and update stored map data using activity data 102 received from mobile devices 140 through network 150 (e.g., a local area network, wide area network, the Internet, etc.). In some embodiments, data for a map may be stored in terms of geospatial entities and the stored data is referred to herein as entity data. A geospatial entity may correspond to a subset of the map area (e.g., a road segment), a particular point on the map (e.g., a point of interest, an area of interest) or the like.

As described in detail below, server device 110 can analyze activity data 102 received from mobile devices 140 and detect differences between the stored entity data and the received activity data. System 100 can then identify locations whose entity data is most in need of updating and, for example, report such geospatial entities to a map product delivery system for updating.

In some embodiments, activity data 102 includes attribute values (also referred to herein as activity attribute values) for several different activity attributes associated with activity performed at or by mobile device 140. For example, as mobile device 140 moves through space, mobile device 140 may detect its own location and generate location data. Location data may consist of several attributes, such as a physical location or position attribute of mobile device 140 in space, a speed attribute for the movement of mobile device 140, a direction attribute of mobile device 140. Activity data 102 may include attribute values for each of the abovementioned attributes. Attribute values may have different units, dimensions, or means of measuring the values. For example, the location attribute may have a value represented by geographic coordinates (e.g., 41°54'43.7"N 12°30'05.1"E). The speed attribute may have a value in miles per hour (e.g., 50 mph). The direction attribute may have a value in terms of a bearing (e.g., 025 degrees). Each attribute may also have an associated date and/or timestamp.

In some embodiments, system 100 can include mobile devices 140. For example, mobile device 140 can be a laptop computer, desktop computer, smartphone, tablet computer, wearable device, or any other computing device. The user may use software-based mobile application 145 on mobile device 140 to perform various functions. For example, application 145 may be a mapping application with a map display, list display, and several other display and interaction controls. Application 145 may display representations of map items (e.g., metadata, images, descriptions, etc.) and enable the user to, for example, get and view driving directions from one location to another. As another example, application 145 may be used to locate particular points of interest, such as restaurants. In this example, application 145 may employ location services provided by mobile device 140 to locate and provide nearby restaurant locations to the user. Application 145 may be, in another example, a media capture and sharing application that enables the user to take photos and/or video and provide this content to the user's social contacts.

As described above, activity data 102 may include several different activity attributes associated with activity performed at or by mobile device 140. For example, activity data 102 may include location data representing a current location of mobile device 140. Each mobile device 140 may execute a location module (not shown) that generates location data for applications that execute on mobile device 140. Activity data 102 may include wireless network data that may be generated each time mobile device 140 detects a wireless network. Activity data 102 may include application use data that represents application use events such as application launch, application update, application-specific data, or the like.

In some embodiments, a computing device can evaluate activity data 102 that is received from mobile devices 140 and determine whether activity data 102 accurately represents the current physical state of a geospatial entity. For example, a computing device can evaluate activity data 102 that is received from mobile devices 140 and determine whether activity data 102 accurately represents the current physical state of a road. The computing device may be, for example, server device 110 that stores and analyzes activity data 102 received from multiple external sources (e.g., mobile computing devices 140).

In some embodiments, activity data 102 may include location data, which includes data for a geographic location for mobile device 140. In an embodiment, mobile device 140 may detect a geographic location of mobile device 140 at a particular time. Mobile device 140 may save or record this geographic location as location data to local storage at mobile device 140. Mobile device 140 may also transmit the location data to server device 110 as activity data 102. Activity data 102 can include a single instance of location data for mobile device 140 (e.g., where mobile device 140 transmits the location data as it is collected). Activity data 102 can include multiple instances of location data for mobile device 140 (e.g., where multiple location data instances are collected and sent to server device 110 in a batch process).

Mobile device 140 may be configured to transmit location data to server device 110 through network 150. The transmitted location data may be stored as location data 122 within data storage 132 by server device 110. In an embodiment, mobile device 140 may transmit location data to server device 110 periodically (e.g., every 10 seconds). In an embodiment, mobile device 140 may transmit location data to server device 110 in response to particular events. For example, mobile device 140 may transmit location data to server device 110 in response to a query by server device 110, or any time an application executing on mobile device 140 requests, provides, or otherwise uses location data.

In some embodiments, activity data 102 can include wireless network data. For example, mobile device 140 can detect the presence of nearby wireless networks each time mobile device 140 is within a certain distance of a wireless network access point. Whether or not mobile device 140 connects to a particular wireless network or communicates with a wireless network access point, mobile device 140 can generate wireless network data each time mobile device 140 detects a wireless network. The wireless network can include a Wi-Fi network, cellular data network, Bluetooth network, or any other wireless data network. Wireless network data may include network access point identifiers, connection times, signal strength values, wireless network provider identifiers, or the like. Wireless network data may also include wireless network usage data that includes data regarding wireless network usage in terms of upload/download statistics, connection times, connection duration, or the like.

Mobile device 140 may, for example, connect to a Wi-Fi access point. For example, a user may connect mobile device 140 to a Wi-Fi access point at the user's workplace or home, or the user may connect mobile device 140 to a public Wi-Fi access point, such as at a store, shopping mall, college, or the like. Mobile device 140 may also connect to a wireless network using a GSM network, a GPRS network, an EDGE network, a Wi-Fi or WiMax network, and a Bluetooth™ network. In each case, server device 110 may collect wireless network data from mobile device 140. In an embodiment, mobile device 140 transmits wireless network data to server device 110 periodically (e.g., every 10 seconds). In other embodiments, mobile device 140 transmits wireless network data to server device 110 in response to particular events. For example, mobile device 140 may transmit location data to server device 110 in response to a query by server device 110, or any time mobile device 140 connects to or disconnects from a particular wireless network.

In some embodiments, activity data 102 can include application use data. A variety of mobile applications may execute on mobile device 140. For example, mobile device 140 can generate application use data whenever the user of mobile device 140 uses a software application on mobile device 140. For example, each time an application is launched, mobile device 140 may register an application launch event. Similarly, mobile device 140 may log application launch events, application deletion events, application use times, application use locations, application-specific mode data, or the like. For example, mobile device 140 may execute application 145 as shown in FIG. 1. Each time application 145 is launched, mobile device 140 may be configured to log and/or transmit an application launch event to server device 110. Similarly, mobile device 140 may transmit an application deletion event to server device 110. For example, mobile device 140 may transmit to server device 110 a notification that a particular application was deleted within a certain geographic area. In addition, mobile device 140 may transmit how long application 145 was used.

In an embodiment, application 145 may be a financial application. For example, application 145 may be associated with a payment processing system vendor (e.g., a credit card company or bank). Application 145 may be configured to store information for the user's financial accounts for use in payment transactions. In this example, a user may use application 145 to make mobile payments at, for example, a merchant (e.g., a restaurant). Mobile device 140 may be configured to collect this application use data and provide it to server device 110. For example, the user's behavior of launching and using application 145 as described in this example may indicate that the user is currently located at or near a business or merchant that accepts mobile payments. Server device 110 may be configured to receive this application use data and correlate with location data for mobile device 140 that may be used to verify the merchant location.

In another embodiment, application 145 may be an application associated with a particular merchant or group of merchants. For example, application 145 may be associated with a shopping mall or department store. The user may use application 145 to browse various stores within the shopping mall. For example, mobile device 140 may register an application launch event and transmit it to server device 110, which in turn may determine that the user is at the shopping mall location.

In some embodiments, mobile device 140 may transmit the location where application 145 was used. The location of use for application 145 may correspond to a particular geospatial entity. In an embodiment, server device 110 may be configured to receive application use data for a specific point in time indicating that application 145 (or any other application) was used on mobile device 140 and correlate it with location data that is received from the same mobile device 140 for the same point in time. Server device 110 may be configured to use the location data (for the application use instance) to identify the geospatial entity that corresponds to the location data. For example, server device 110 may compare the location data for the application use instance for application 145 with geospatial entities in order to match the application use location with a geospatial entity. In another embodiment, mobile device 140 may transmit an identifier for the geospatial entity for server device 110 to recognize the geospatial entity that corresponds to the location where application 145 was used.

In some embodiments, each mobile device 140 may execute a location module (not shown) that generates location data for applications that execute on mobile device 140. For example, when a weather application on mobile device 140 is invoked, the weather application can request the current location of mobile device 140 from the location module so that the weather application can provide weather data for the user's current location. As another example, application 145 may be a social media application that associates the current location of mobile device 140 with some user activity performed at that location. For instance, the user may take photos or video at a location and mobile device 140 may request its current location from the location module to associate the current location with the recently captured media. Each application may make location data requests to the location module. In response, the location module determines the location of mobile device 140 and returns it to the requesting application.

In some embodiments, the location module can operate without activation by any location data request and may just run as a background process to periodically determine and report locations (e.g., to report location data to server device 110). In an embodiment, location data may be reported to server device 110 any time application 145 uses the location module service to determine location.

In some embodiments, mobile device 140 can generate location data and report the location data to server device 110. Server device 110 can store the location data (e.g., location data 122) in data storage 132. For example, location data can include information describing a mobile device's location, direction, speed, and/or time at which the mobile device's location, direction, and/or speed were determined. When analyzed collectively, multiple instances of location data may allow server device 110 to trace mobile device positions in space over time.

In some embodiments, the location data in location data 122 may include any data indicative of geographic coordinate data, global navigation satellite system data, distance from a fixed point, cardinal direction points, bearing data, angle data, or the like. The speed data in location data 122 can correspond to the speed at which mobile device 140 is traveling, as determined by the distance traveled and time between location determinations. The direction component of location data 122 may correspond to a direction calculated using a current location point and the location point that was recorded immediately prior to the current location point. More specifically, a direction or heading may be identified by determining a direction of a directed line or vector drawn from the prior location point to the current location point. The time component of location data 122 may correspond to a current time reported by, for example, a processor of mobile device 140. Location data 122 may include any data indicative of whether mobile device 140 is/was traveling a requested route. In an embodiment, mobile devices 140 may be configured to not transmit location data 122 or any activity data 102 at all (e.g., where mobile device 140 is unsold, in the process of being shipped, etc.). Mobile devices 140 may be configured to provide users with the ability to opt in or out of providing activity data 102 to server device 110. The location module of mobile device 140 may also determine speed using speed sensors associated with mobile device 140.

In some embodiments, data storage 132 can include entity data 124. As described above, the real world is modeled as various geospatial entities. For example, a real world geographic area may be decomposed into geospatial entities that are each of equal size and represent a particular subsection of the real world. These geospatial entities may be virtual constructs that exist only as location data without any stored visual representation. For example, the real world geographic area may consist of one square mile. Server device 110 may be configured to store a data representation of this one square mile area in terms of latitude and longitude values denoting the boundaries of the physical area. Furthermore, server device 110 may generate subsets of the data representation by generating subsets of the latitude and longitude values. These subsets of values may represent a particular geospatial entity (e.g. one that is ten square yards and represents a fraction of the full geographic area).

In an embodiment, server device 110 may convert a digital representation of a map into a set of geospatial entities. For example, the map may be divided into polygonal shapes (e.g., squares). Each geospatial entity may be tagged with several identifiers. For example, each geospatial entity may be associated with a geospatial entity identifier, a geographic location identifier (e.g., latitude/longitude values) or the like. Each geospatial entity may be associated with a geospatial entity type. For example, a geospatial entity may represent part of a road. As an example, such a geospatial entity may be interpreted as a geospatial entity of type 'road segment'. Similarly, a geospatial entity may include a road segment as well as another entity type, such as a point of interest. Mobile device 140 may execute a mapping application that may be configured to receive entity data 124 and use entity data 124 to build a visual representation of a map for use by a user of mobile device 140.

In an embodiment, as described above with respect to location data 122, activity data 102 received from mobile devices 140 may have attributes for latitude and longitude. Server device 110 may be configured to then map these latitude and longitude coordinates to a particular geospatial entity. For example, a location point received from mobile device 140 may represent mobile device 140's location in terms of latitude and longitude values. Similarly, each geospatial entity may be represented in terms of latitude and longitude values as described above with respect to entity data 124. Server device 110 is configured to use the latitude and longitude values for the location point and identify the corresponding geospatial entity. For example, the location point may have values of 25°43'52"N 80°17'04"W. These values may correspond to a geospatial entity that is a square defined by the values 25°43'53"N 80°17'05"W (top left corner), 25°43'53"N 80°17'03"W (top right corner) 25°43'51"N 80°17'05"W (bottom left corner), and 25°43'51"N 80°17'03"W (bottom right corner). Accordingly, server device 110 may associate the particular location point with the geospatial entity.

In some embodiments, geohashing algorithms may be implemented to store geospatial entity data within entity data 124. As used herein, geohashing refers to a method of encoding a geographic location in terms of a string of letters and/or numbers. For example, a geohashing algorithm may encode a map location (e.g., a subset of a map) into an alphanumeric string that is also referred to as the geohash for that location. A particular map location, such as a road segment, point of interest, area of interest, intersection, elevation point, or the like may be include within the map location that is stored as a geohash. The alphanumeric string is associated with the map location within entity data 124. In an embodiment, the first three digits of the geohash for a location may be used as an identifier for the map location.

In some embodiments, entity data 124 for a geospatial entity may include the type of real world location or entity modeled by the geospatial entity. For example, where the geospatial entity models a part of a road segment, entity data 124 for the geospatial entity may indicate this (e.g., by using a type identifier 'road'). More specifically, entity data 124 may define one or more roads as a polyline. As used herein, the term 'polyline' refers to a connected sequence of line segments that are created and/or interpreted as a single object. A polyline can include straight line segments, arc segments, or a combination of the two. Entity data 124 for a road may be expressed as a set of connections and/or subsegments between several geospatial entities. Accordingly, server device 110 may be configured to store connections or associations between contiguous geospatial entities to model the complete road segment. Entity data 124 for a road segment may be expressed in terms of a suitable data structure, such as a directed or undirected graph, a graph database, linked list, or the like.

In some embodiments, data storage 132 includes user behavior data 126. User behavior data 126 may include location data, wireless network data, and application use data as described above. User behavior data 126 also refers to specific user behaviors determined by server device 110 from the location data or location data received from mobile device 140. For example, as described above, location data may indicate a user's location, heading/direction, and speed. Server device 100 may use these attributes of location data to determine, based on the speed for example, that the user is driving, or that the user is walking.

Server device 110 may be configured to associate specific activity levels relating to user behavior with entity data 124 for a geospatial entity. An activity level for a geospatial entity may correspond to an amount or magnitude of activity for an activity attribute associated with a particular user behavior at that geospatial entity. For example, driving a car may be a user behavior that can take place at a geospatial entity. For car driving, activity attributes may include a number of cars driven across the map area corresponding to the geospatial entity, the speed of the cars while driving, particular car-related mobile applications used while driving, car Bluetooth connection usage instances, or the like. Server device 110 uses attribute values for each activity attribute to determine a particular activity level for that activity attribute.

In terms of location, a geospatial entity represents, for example, polygons, polylines, line strings, or a set of points in space for a section of the real world. However, activity at a location may vary. Consequently, user behavior associated with a particular geospatial entity may change as well. For example, users may travel over the geospatial entity at various times and speeds. Users may launch various different applications within the physical space represented by the geospatial entity. Users' devices may detect different wireless points within the physical space represented by the geospatial entity. Accordingly, data collected regarding user behavior (e.g., driving, walking, heading, application launch data) that is associated to a geospatial entity within entity data 124 may change over time.

In some embodiments, server device 110 may be configured to store activity data 102 received from mobile device 140 for a location point in association with the geospatial entity that includes that location point. For example, activity data 102 from mobile device 140 may indicate that a user is currently traveling at 50 miles per hour while also using application 145, where application 145 is a mapping application. Server device 110 may associate activity data 102 as described above to the geospatial entity that corresponds to the location point where that activity data 102 was first generated. Server device 110 may associate activity data 102 as described above to the geospatial entity that corresponds to the location point where mobile device 140 transmitted that activity data 102. Server device 110 may use this activity data 102 to determine that the user is driving an automobile and that the geospatial entity corresponding to that location point is a road segment.

In another example, activity data 102 from mobile device 140 may indicate that a user is currently traveling at three miles per hour while also using application 145, where application 145 is an outdoor activity application (e.g., a fitness tracking application, a nature tour application, or the like). Server device 110 may associate activity data 102 as described above to the geospatial entity that corresponds to the location point where that activity data 102 was first generated. Server device 110 may also associate activity data 102 as described above to the geospatial entity that corresponds to the location point where mobile device 140 transmitted that activity data 102. Server device 110 may use this activity data 102 to determine that the user is walking and that the geospatial entity corresponding to that location point is, for example, a public park or nature preserve. More particularly, server device 110 may aggregate a number of instances of activity data 102 received from the geospatial entity where a large proportion of these instances indicate activity similar to the user described above (e.g., movement at a walking speed). Server device 110 may determine, based on the aggregation, that the geospatial entity is associated with, for example, a walking path.

Continuing with the driving user example, server device 110 may be configured to associate each road segment with specific driving statistics. For example, activity data 102 may be received from a group of users where each user's activity data indicates that the user is driving an automobile. Server device 110 may be configured to identify that each user of the user group recently drove over the same road segment. Server device 110 may be configured to generate a driving count for the road segment, based on activity data 102 received for the users of the user group. For example, a driving count for the road segment may refer to a number of vehicles traversing the road segment for a particular period of time.

Similarly, mobile devices 140 for each of the users in the abovementioned user group may indicate a particular direction of travel. For example, location data within activity data 102 for each user in the group may indicate that each user is heading in an easterly direction. Server device 140 may be configured to determine, using the activity data 102 for each user in the group, that the user group is traveling over a road segment that is intended for travel in an easterly direction.

More broadly, data storage 132 can include any data that may be indicative of map geometry, road network data, buildings, content about map objects, object names (e.g., road names, building names), or the like. In some embodiments, entity data 124 may include any data indicative of geographic coordinate data, Global Positioning Satellite (GPS) data, a set of points defining a line, a mathematical equation that can be used to define a line, real images (e.g., photographs) of physical roads in a particular region, virtual images (e.g., drawings, graphs, lines, etc.) that are virtual representations of the roads, or the like.

In some embodiments, server device 110 includes a map service 112. For example, map service 112 may be a software application executing on one or more computer processors of server device 110. Map service 112 includes an activity data extractor module 114. Activity data extractor module 114 may be configured to receive activity data and prepare activity data 102 for change detection analysis.

In some embodiments, activity data extractor module 114 may be configured to receive activity data 102 that includes location data for one of mobile devices 140. The location data may include a set of location points that represents a traveled route for mobile device 140. These location points are correlated with entity data 124 using their location attributes. For example, mobile device 140 may travel on a road segment that corresponds to a certain latitude and longitude. The road segment may in turn be stored in entity data 124 as a geospatial entity of type 'road' with similar latitude and longitude values. Accordingly, activity data extractor module 114 may be configured to correlate location data received from mobile devices 140 with entity data 124 for the abovementioned road segment.

In some embodiments, activity data extractor module 114 may be configured to extract a number of activity data points from activity data 102. An activity attribute may be extracted from activity data 102 (e.g., driving or walking). For example, a speed value for the location data may indicate that the mobile device was within a car as it traveled over the road segment. Accordingly, activity data 102 may indicate that the user of mobile device 140 was driving over the road segment. This may be used to determine, for example, that a driving count for the road segment should be increased by one.

In some embodiments, activity data 102 received from mobile devices 140 is anonymized in order to remove identifying information from activity data 102. The anonymization process ensures to remove any data that can be used to identify or track the location of mobile device 140 or a user of mobile device 140. The anonymization process may be completed before activity data 102 reaches server device 110. In an embodiment, a separate anonymization service (not shown) receives activity data 102 before it reaches server device 110. Activity data 102 may be associated with an identifier for activity data 102, but this identifier cannot be used to identify mobile device 140 or its user.

In some embodiments, map service 112 may include aggregator module 116. Aggregator module 116 may be configured to identify attribute values for particular activity attributes for multiple time windows and group these values for computing various statistics. As described above, a count of the number of drivers (or driving count) traveling over a road segment (or any geospatial entity) may be determined using activity data 102 received from each user that drove over the road segment within a period of time. For the road segment, driving counts may be aggregated to generate mean, median, mode, standard deviation, percentile, and other values for driving counts for that road segment. More specifically, aggregator module 116 may be configured to identify an attribute value for a particular geospatial entity and collate the attribute value with a similar attribute value for that geospatial entity. For example, when one of mobile devices 140 travels over part of a road segment represented by a particular geospatial entity identifier, the traversal may generate a driving count. Once another one of mobile devices 140 travels over the same geospatial entity, the traversal may generate another driving count. Aggregator module 116 may be configured to collate the two driving count attribute values and associate them to the driving activity attribute for that geospatial entity.

In some embodiments, aggregator module 116 may be configured to aggregate over multiple time windows and to generate specific aggregated values. For example, aggregator module 116 may be configured to aggregate attribute values for particular activity attributes over a daily time period and a monthly time period. Aggregator module 116 may be configured to aggregate attribute values for particular activity attributes into sections of time that end in a particular date or time. Aggregation module 116 may be configured to generate pivot tables, transposed time-series, and other statistical measures for aggregated attribute values for each activity attribute.

In some embodiments, aggregator module 116 may be configured to aggregate attribute values by a category of activity data attribute. For example, aggregator module 116 may aggregate all attribute values that correspond to a particular category of application, a category of user activity (e.g., driving), a type of connectivity being used (e.g., Wi-Fi), or the like. Aggregator module 116 may be configured to aggregate attribute values for a particular application or type of application, for instance. In an embodiment, aggregator module 116 may aggregate all instances of use of an application within a geospatial entity over a period of time. Aggregator module 116 may aggregate application launch and deletion events for a particular application or category of application. Aggregator module 116 may aggregate application use events by category of application. For example, there may be multiple restaurant review applications being used at mobile devices 140. This may be the case where several users (and their mobile devices 140) may be located at a shopping mall food court and reading reviews of restaurants using multiple restaurant review applications. Aggregator module 116 may be configured to identify the different restaurant review applications as being of the same category of application and aggregate application use events together for each of these restaurant review applications.

Additionally, aggregator module 116 may be configured to filter out low-confidence records that are unlikely to result in meaningful statistics. Low-confidence records may be filtered out where aggregator module 116 receives attribute values that represent statistical outliers for the activity data associated with the geospatial entity. For example, aggregator module 116 may receive an attribute value for an activity attribute of a road segment where the location data indicates that the driving speed is extremely low compared to the speed limit. This may indicate, for example, a mobile device inside a construction vehicle that is performing road work. In an embodiment, aggregator module 116 may filter out attribute values for the mobile device, based on a determination that these attribute values do not accurately represent a typical activity state for the road segment.

In some embodiments, server device 110 may determine the expected activity levels for activity data at a geospatial entity. As used herein, an expected activity level represents an average activity level that has been historically observed for a particular activity data attribute. The expected activity level may be determined using aggregated attribute values over periods of time. Moreover, each activity data attribute may be associated to a geospatial entity. Accordingly, the expected activity levels of activity for an activity data attribute may be determined from the aggregated attribute values for that activity data attribute associated with the geospatial entity. For example, attribute values for driving count for a geospatial entity may be aggregated over a period of a day. More specifically, an aggregated driving count for the geospatial entity may be 2400 drivers per day. Thus, the expected driving count for the geospatial entity may be 2400 drivers per day, or 100 drivers per hour, or 1.67 drivers per minute.

The expected activity level may also be expressed as a range of values. The range of values may have an associated variance level. In some embodiments, server device 110 may compare the variance associated with the expected activity level (expressed as a range) for a particular time period with the expected activity level for a separate time period in the past. Server device 110 may use the comparison to determine, for example, that the geospatial entity exhibits a low variance history. In other words, the expected activity levels for the geospatial entity remain relatively consistent. Server device 110 stores may store this variance history determination in association with the geospatial entity. Server device 110 may determine that, given the consistent activity level, even a small change in activity level relative to the expected level may be more significant for the geospatial entity as compared to another geospatial entity where expected activity levels exhibit higher variance over time.

In some embodiments, expected activity levels are generated for each activity attribute of a geospatial entity. As an example, a geospatial entity may have associated with it activity attributes for driving, walking, heading, application use, and wireless access points. Where the geospatial entity corresponds to a road segment, activity data extractor module 114 may extract statistically significant attribute values for driving activity attributes. Conversely, the geospatial entity may not have any statistically significant attribute values associated with walking activity attributes, particularly if the road segment is a highway or other high-speed road. Similarly, activity data extractor module 114 will likely not extract statistically significant attribute values associated with driving activity attributes for a geospatial entity associated with a forest or indoor location. For example, a geospatial entity representing part of an indoor shopping mall may exhibit a driving count of zero. Similarly, a geospatial entity representing part of a forest may exhibit few or no attribute values for application use associated with a ride hailing application category. However, expected activity levels may be generated for each activity attribute regardless of the underlying geography associated with the geospatial entity.

In some embodiments, entity change detection module 118 may be configured to detect one or more changes to activity for a geospatial entity. Entity change detection module 118 may be configured to compare the expected activity level(s) for activity data associated with a geospatial entity to a currently observed activity level for the corresponding activity attributes. Entity change detection module 118 may be configured to detect that the currently observed activity level deviates from the expected activity level by some threshold level. Where the deviation exceeds the threshold level, entity change detection module 118 may be configured to identify the geospatial entity as a changed geospatial entity. As used herein, a changed geospatial entity refers to a geospatial entity that is undergoing activity change beyond a certain threshold level.

In some embodiments, entity change detection module 118 may be configured to fetch attribute values from data storage 132. Entity change detection module 118 may query data storage 132 to retrieve attribute values for a geospatial entity for a particular point in time. For example, entity change detection module 118 may retrieve attribute values associated with driving count, walking count, and application launch count for a particular road segment for the first day of the current month. As another example, entity change detection module 118 may retrieve attribute values such as driving count, walking count, and application launch count for the road segment from last year for the same date as the current date. Entity change detection module 118 may determine that these retrieved attribute values represent an expected activity level for the activity data associated with that geospatial entity. Entity change detection module 118 may also be configured to retrieve attribute values from a prior day of the same week, from a weekday (as compared to a weekend day), or a particular holiday (which may occur on different weekdays or weekend days), or the like.

Entity change detection module 118 may be configured to determine a currently observed activity level for an activity data attribute as well as an expected activity level for the activity attribute associated with the geospatial entity. For example, the currently observed activity level may be determined using currently observed activity levels for the activity attribute as received from mobile devices 140. In an embodiment, entity data 124 is organized as a rich data store with values organized by activity attribute, by geospatial entity, by date, and by other statistical dimensions. Accordingly, entity change detection module 118 may retrieve attribute values of the same geospatial entity by using an entity identifier and/or an activity data identifier, and limiting the query to a particular date.

In some embodiments, once the expected activity level and the currently observed activity level are determined, entity change detection module 118 may be configured to compare the two levels. Entity change detection module 118 may be configured to calculate a numerical difference between the two levels. The difference may correspond to an unsigned magnitude of difference between the two levels, a magnitude of change, an absolute value resulting from the numerical subtraction of one level from another, or the like. For example, an expected activity level for the activity attribute of driving count for a geospatial entity may be 100 drivers per minute. This expected activity level may have been determined by aggregator module 116 using driving count attribute values for the prior month. Similarly, a currently observed activity level for the activity attribute of driving count for the same geospatial entity may be 250 drivers per minute. Entity change detection module 118 may be configured to calculate the numerical difference of 150 drivers between the expected activity level and the currently observed activity level. In some embodiments, entity change detection module 118 may determine a ratio of the difference to the expected activity level or compute the difference in terms of standard deviations from the expected activity level.

In some embodiments, entity change detection module 118 may determine whether the difference exceeds a threshold level. Where the difference does exceed a threshold level, entity change detection module 118 may identify the geospatial entity as one that is experiencing higher than normal activity based on currently observed activity levels. The abovementioned difference between levels may correspond to an increase in activity, a decrease in activity, an observation of new activity where none previously existed, and an observation that activity has fallen to zero where there was previous statistically significant activity for a particular activity attribute. For example, driving count for a road segment may have an expected activity level of 100 drivers per minute. Currently observed driving count levels may fall to zero drivers per minute (e.g., due to a road closure). In this latter case, entity change detection module 118 is still configured to identify the geospatial entity as a changed geospatial entity. Similarly, the expected activity level of cellular phone application use for a geospatial entity may be zero based on historical values for this activity attribute. Currently observed activity levels may be non-zero for cellular phone application use or Wi-Fi use for a geospatial entity. This may indicate, for example, that the geospatial entity now had cellular network(s) available where previously there were no accessible cellular networks. Entity change detection module 118 may also identify the geospatial entity as a changed geospatial entity using application use data or category of application use data (e.g., where a new category of mobile applications is now being used compared to in the past).

Figure 2:
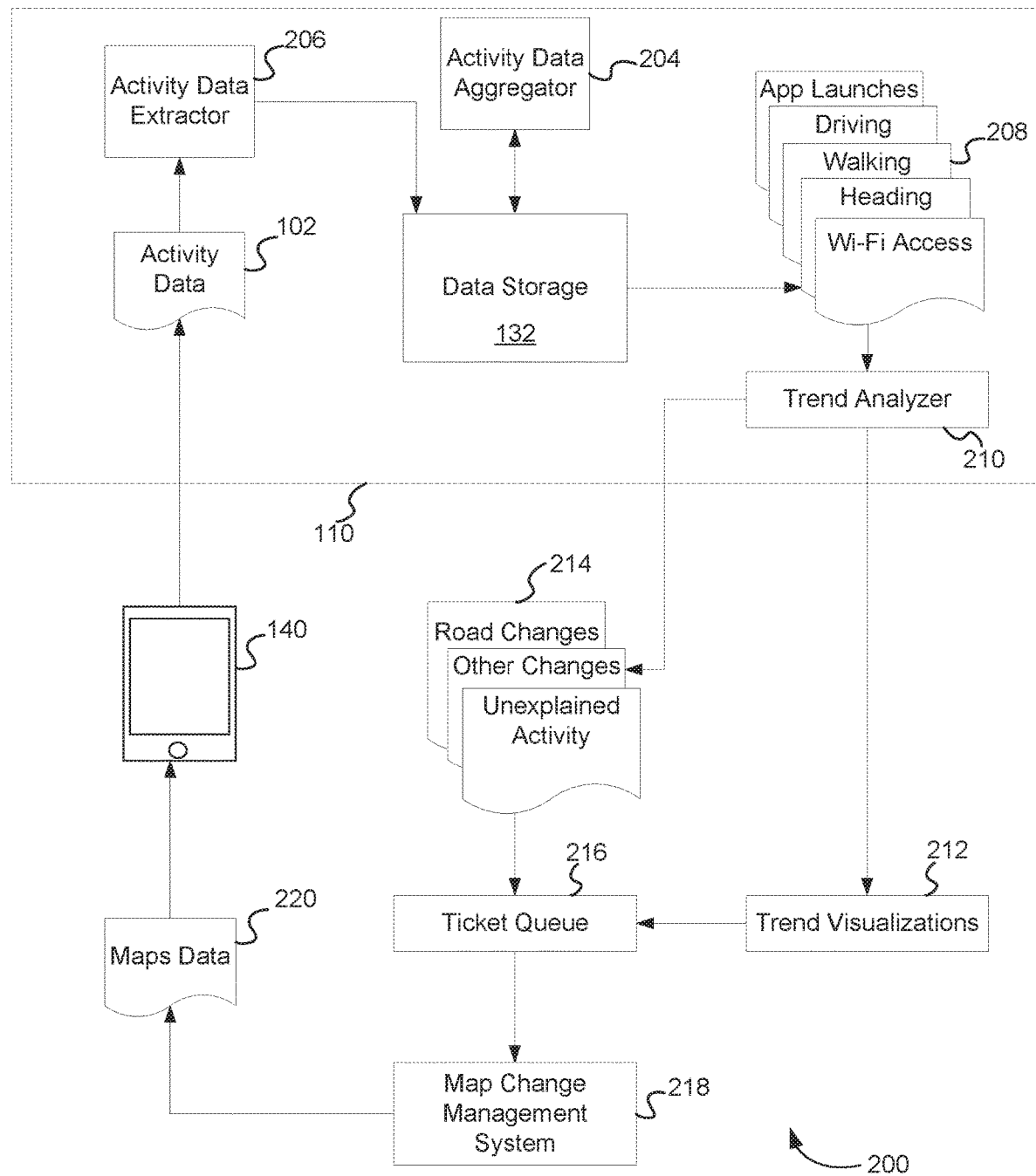
FIG. 2 is a data flow diagram for an example system for active change detection for geospatial entities using trend analysis.

FIG. 2 is a data flow diagram 200 for an example system for active change detection for geospatial entities using trend analysis. As shown, data storage 132 (also shown in FIG. 1), activity data aggregator 204, activity data extractor 206, and trend analyzer 210 may form a part of server device 110 (shown in FIG. 1).

In some embodiments, data storage 132 may be configured to store data for geospatial entities. Data storage 132 may correspond to data storage 132 shown in FIG. 1. As described above with respect to FIG. 1, mobile devices transmit activity data to be stored in data storage 132. More specifically, FIG. 2 shows mobile device 140 that generates and transmits activity data 102. For example, mobile device 140 can correspond to mobile device 140 that is described above with respect to FIG. 1. Activity data 102 can correspond to activity data 102, described above with respect to FIG. 1. Activity data 102 may be processed by activity data extractor 206. Activity data extractor 206 may be similar to activity data extractor module 114 described above with respect to FIG. 1.

Activity data extractor 206 may be configured to extract values for multiple activity attributes from activity data 102. For example, activity data extractor 206 may analyze location data within activity data 102 for mobile device 140 to identify a current location, speed, and heading for mobile device 140. The location data may indicate that mobile device 140 traveled at a speed of 65 miles per hour. Activity data extractor 206 may be configured to correlate the speed data with the location data for mobile device 140 to determine the specific geospatial entity that mobile device 140 was traversing. For example, activity data extractor 206 may determine that mobile device 140 was traveling across a particular geospatial entity that represents a highway road segment. Based on the speed attribute value, activity data extractor 206 may be configured to determine that the user operating mobile device 140 is inside a car or other vehicle being driven on the road segment. Accordingly, activity data extractor 206 may be configured to update an activity attribute, such as a driving count, for the road segment. Activity data extractor 206 transmits the extracted attribute values for the activity attributes to data storage 132.

Activity data aggregator 204 may be configured to receive the extracted attribute values from data storage 132 and organize these attribute values into various groups or collections. For example, activity data aggregator 204 may receive driving counts for a particular road segment and aggregate these using different time windows, such as by week, by day, or by hour. Activity data aggregator 204 may aggregate these attribute values by activity category (e.g., driving activity, walking activity, application launch activity, wireless network detection activity). For example, activity data aggregator 204 may receive attribute values associated with application use attributes. As a more specific example, activity data aggregator 204 may receive application use data for multiple social networking applications that were launched at mobile device 140 or multiple mobile devices (e.g., mobile devices 140, shown in FIG. 1). Activity data aggregator 204 may be configured to aggregate each of the values representing social networking application use by a type called 'social networking application launch'. Activity data aggregator 204 provides the aggregated values for social networking application use attribute to data storage 132.

In some embodiments, activity data aggregator 204 may aggregate the attribute values according to a number of statistical measures. For example, activity data aggregator 204 may aggregate the attribute values to generate a mean, median, mode, standard deviation, percentile distribution, and other statistics for each activity attribute.

In some embodiments, data storage 132 may provide the aggregated values 208 for activity attributes to trend analyzer 210. For example, data storage 132 may provide to trend analyzer 210 attribute values for driving activity, walking activity, application launch activity, wireless network use activity, and heading activity (i.e., which direction a user appears to be headed).

Trend analyzer 210 may be similar to entity change detection module 118 (shown in FIG. 1). Trend analyzer 210 may be configured to identify a geospatial entity, determine an expected activity level for a specific activity attribute associated with the geospatial entity, determine a currently observed activity level for the geospatial entity based on received activity data, and generate a trend analysis representing changes to the activity data over time.

In some embodiments, trend analyzer 210 may be configured to detect one or more changes to activity for a geospatial entity. Trend analyzer 210 may be configured to compare the expected activity level(s) for an activity attribute of a geospatial entity to a currently observed activity level for the corresponding activity attribute. Trend analyzer 210 may be configured to detect the trend for the geospatial entity for a particular activity attribute. For instance, the geospatial entity may be a road segment for a busy downtown intersection. Hundreds of cars may traverse the geospatial entity per minute, for example. Relatedly, the road segment may exhibit activity signifying heavy traffic such that car movements may be slower but near continuous with little or no intervals in between.

In some embodiments, trend analyzer 210 may be configured to periodically compare the expected activity level for an activity attribute with the currently observed activity level for the activity attribute. For example, trend analyzer 210 may determine that the abovementioned road segment has a currently observed activity level for driving count that comports with the expected activity level. More specifically, the expected and current levels may be similar (e.g., an expected activity level of 100 cars per minute vs. a currently observed activity level of 98 cars per minute for driving count). Accordingly, trend analyzer 210 may determine that there is little activity change for the road segment.

In some embodiments, trend analyzer 210 sets a particular threshold level for the difference between the expected activity level and the currently observed activity level. As another example, trend analyzer 210 may set a threshold level of ±20 for driving counts. Additionally, trend analyzer 210 may determine that while an expected activity level for driving count was 100, a currently observed activity level for driving count has risen (or fallen) by 60 drivers. In this example, trend analyzer 210 may determine that the difference for the driving count activity attribute exceeds the threshold level for the road segment. This may represent a high activity change for the road segment. Accordingly, trend analyzer 210 may be configured to identify the road segment as a geospatial entity that is undergoing high activity change. Trend analyzer 210 may be configured to determine a ratio of the difference to the expected activity level. Threshold levels may also be expressed in terms including, but not limited to: absolute differences, changes in terms of standard deviation, or the like.

In some embodiments, trend analyzer 210 may be configured to identify correlations between geospatial entities that are undergoing significant activity change that exceeds a threshold level. For example, trend analyzer 210 may be configured to select a particular geographic region (e.g., a region one square mile in area bounded as a square with sides of lines of length 1 mile). Within the geographic region, trend analyzer 210 may be configured to identify each geospatial entity that exhibits high activity change based on a particular threshold. In an embodiment, trend analyzer 210 may be configured to define multiple thresholds for various levels of activity. For each threshold, trend analyzer 210 may be configured to determine whether a difference between an expected activity level and a currently observed activity level for an activity attribute of a geospatial entity exceeds the threshold, as described above.

In some embodiments, trend analyzer 210 may be configured to generate trend analysis data 214 based on the abovementioned trend analysis. Trend analysis data 214 may include data points that represent multiple types of change for various geospatial entities. In an embodiment, trend analyzer 210 may be configured to combine values for different activity attributes to determine activity changes. For example, trend analyzer 210 may combine statistics for speed values from location data and for application use values from application use data from within activity data 102 received from mobile device 140. For instance, where the speed corresponds to a human running speed and the application use data indicates use of a fitness tracking application, the speed data/application use data combination may indicate that, for instance, that a user is running for exercise. Trend analyzer 210 may generate a combined or composite activity attribute to represent the combination of the location data and the application use data. In the above-mentioned example, a composite activity attribute combining the speed data and the fitness tracking application use data may be included within trend analysis data 214. The composite activity attribute may indicate that the geospatial entity associated with the composite activity is now being used for, for example, outdoor exercise.

Trend analyzer 210 may composite attribute values from multiple mobile devices to arrive at trend analysis data 214. As another example, trend analyzer 210 may combine changes in statistics from wireless network access point detections and media viewing applications from multiple mobile devices. Trend analyzer 210 may generate a composite activity attribute that indicates that a particular geospatial entity now exhibits higher than expected usage of wireless network access points and applications of the media viewing category. The composite activity attribute may be included within trend analysis data 214 to indicate that a particular geospatial entity now exhibits residential media viewing activity where previously there were little or no levels of such activity, indicating new residential use of a geospatial entity.

Trend analysis data 214 may be provided to ticket queue 216 so that the identified activity changes may be reviewed and enacted as changes to map data (e.g., by map change management system 218). Ticket queue 216 may represent a computer system used by a human operator to update map data based on trend analysis data. Trend analyzer 210 may be configured to convert trend analysis data 214 that it identifies into consumable ticket-based items that can be acted upon to update map data. A ticket item may include the geospatial entity to update, the type and degree of change to apply, and the expected result in terms of map data. Trend analyzer 210 may be configured to convert indicators of significant activity change into specific instruction sets that are included in the ticket item, where each instruction set may identify the geospatial entity to update, the nature of the change to be made, and the expected result. Ticket queue 216 may be monitored and consumed by human operators that identify activity data changes embodied by a ticket in the ticket queue 216. Operators then execute those changes to map data that may be delivered to mapping applications in a production environment.

For example, trend analysis data 214 may include road change data. Road change data may indicate changes to road geospatial entities, such as changes to driving counts. Trend analyzer 210 may detect changes in speed limits on a road based on driver speeds slowing down or speeding up. As a result, trend analyzer 210 may provide trend analysis data 214 to ticket queue 216 indicating that map data for the road ought now to account for an additional roadway, higher speed limit, or similar changes to the road attributes. Trend analyzer 210 may also detect changes to a direction of travel on a road. As a result, trend analyzer 210 may provide trend analysis data 214 to ticket queue 216 indicating that map data for the road ought now to indicate that road has changed from a two-way road to a one-way road or vice versa, or that a road is now being used to travel in a different direction than previously (e.g., a westbound one-way street is now being traversed in an eastbound one-way direction).

Additionally, trend analysis data 214 may include data for other changes. For example, trend analyzer 210 may detect changes that represent new points of interest, removed points of interest, changes to points of interest, or the like.

As a more specific example, trend analyzer 210 may detect that a particular fueling station has expected activity levels for certain application use attributes (e.g., convenience store applications, loyalty card applications, or the like). Trend analyzer 210 may further detect that currently observed activity levels include application use data for, for example, an electric vehicle charging application. Trend analyzer 210 may determine that the fueling station has added electric vehicle charging facilities to its existing facilities. Trend analyzer 210 may then provide, to ticket queue 216, trend analysis data 214 indicating, for example, that the fueling station's attributes should be updated to reflect that it now provides conventional fuel as well as electric charging capabilities.

Moreover, trend analysis data 214 may include data representing unexplained activity. For example, trend analyzer 210 may determine a certain expected walking count for a particular public park. Walking counts may be determined using, for example, application use data for telephone applications, messaging applications, or social media or other communication applications, or web browsing applications. Additionally, trend analyzer 210 may detect a sudden and unexpected upsurge in walking count being exhibited in the currently observed activity levels. Trend analyzer 210 may determine that the public park was the site of a special event, such as a music concert. Accordingly, trend analyzer 210 may provide this data to ticket queue 216 indicating that the public park point of interest should be tagged as the occasional site of high walking activity due to special events.

In some embodiments, trend analyzer 210 may be configured to geographically correlate geospatial entities that have been identified as undergoing significant activity change that exceeds a threshold level. More specifically, trend analyzer 210 may identify each geospatial entity within a geographic region that is undergoing significant activity change. Trend analyzer 210 may then compare location identifiers for each geospatial entity and determine whether any changed geospatial entities are proximate or adjacent to each other. For example, a road segment of length 100 yards and width 6 yards may be divided into squares of 1 square yard each. The road segment may have recently exhibited activity change exceeding a threshold level across its extent (e.g., higher driving counts than expected).

Relatedly, trend analyzer 210 may geographically correlate road segments as described above in order to detect, for example, new lanes being added to an existing road segment. For example, trend analyzer 210 may detect that a set of geospatial entity running parallel to a road segment set is exhibiting currently observed driving activity whereas the parallel set previously had no driving activity. As a result, trend analyzer 210 may detect that a new lane, ramp, or other additional roadway has been added to the road segment.

By geographically correlating geospatial entities exhibiting significant activity change, trend analyzer 210 may be configured to generate a cluster of geospatial entities that trend analyzer 210 recognizes as changed geospatial entities. The clustered geospatial entities represent an area of significant activity change. The cluster may represent, for example, a road segment that is seeing an increase in driving traffic. The cluster may represent a road segment that has recently seen a sharp drop in traffic, suggesting construction or traffic diversion. For example, trend analyzer 210 may be configured to generate a visual representation of the cluster of geospatial entities, shown as trend visualizations 212 in FIG. 2. Trend visualizations 212 may render the cluster overlaid on a map of the geographic region, highlighting the area of significant activity change.

In some embodiments, both trend visualizations 212 and trend analysis data 214 are provided to map change management system 218 via ticket queue 216. Map change management system 218 may be configured to update map data to account for the activity changes reflected in trend visualizations 212 and trend analysis data 214. In an embodiment, map change management system 218 may be a computer system operated by human operators that receive tickets from ticket queue 216 and enact changes to map data. In other embodiments, map change management system 218 may be configured to automatically generate updated map data resulting from a ticket in ticket queue 216 and present the updated map data to an operator for approval.

In some embodiments, maps data 220 may be generated by map change management system 218 and delivered to mobile device 140. As described above, maps data 220 represents map data that is updated using trend analysis data 214 and the trend visualizations 212 generated by trend analyzer 210.

Figure 3:
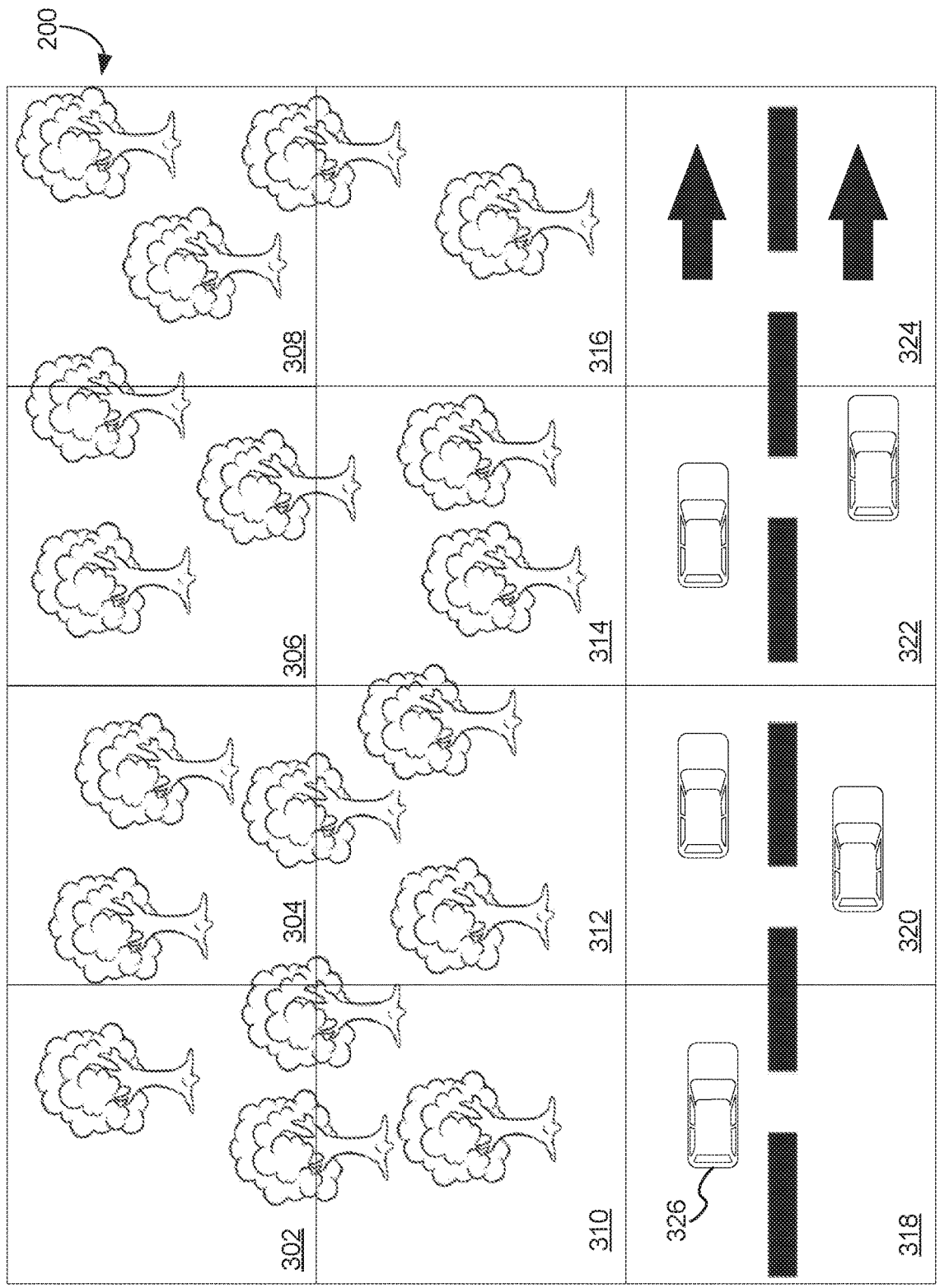
FIG. 3 is a conceptual illustration of a map section showing an expected view of the map section before recent changes to the real world at that map section.

FIG. 3 is a conceptual illustration 300 of a map section showing an example view of the map section before recent changes to the real world at that map section. Illustration 300 shows a real-world representation of a map section with an overlay of a set of geospatial entities corresponding to the map section. The map may be represented as a set of geospatial entities. Each geospatial entity may be associated with an entity identifier. In some embodiments, entity change detection module 118 (shown in FIG. 1) or trend analyzer 210 (shown in FIG. 2) may be configured to subdivide or aggregate together any one of geospatial entities 302, 304, 306, 308, 310, 312, 314, 316, 318, 320, 322, and 324. As mentioned above, FIG. 3 shows a map view representing expected activity levels gathered for the map section over a period of time.

As shown, geospatial entities 302, 304, 306, 308, 310, 312, 314, and 316 are associated with a geographic region that is mostly vegetation. For example, geospatial entities 302, 304, 306, 308, 310, 312, 314, and 316 may correspond to a public park, forest, green belt, sports field, agricultural land, undeveloped land, or the like. Accordingly, activity data extractor module 114 (shown in FIG. 1) or activity data extractor 206 (shown in FIG. 2) may detect other types of activity that are not driving-related from these geospatial entities. For example, mobile devices 140 may transmit activity data 102 within, for example, geospatial entity 310 and activity data 102 may indicate little or no vehicle driving activity. This may be because activity data 102 may have indicated activity that is consistent with the above types of land use. For example, activity data 102 may have included application use data for use of outdoor activity-related applications, weather applications, sports applications, or the like. As another example, activity data 102 may include location data that includes no location data determinations transmitted for any mobile devices 140, no wireless network access point detections received for any mobile devices 140, or the like.

Also shown in FIG. 3 are geospatial entities 318, 320, 322, and 324, which may be associated with a roadway. Geospatial entities 318, 320, 322, and 324 show a two-lane roadway heading in an easterly direction. Each of geospatial entities 318, 320, 322, and 324 may be a geospatial entity that represents part of the two-lane roadway shown. In contrast to geospatial entity 310, a geospatial entity such as geospatial entity 318 is likely to have driving activity associated with it. For example, a vehicle 326 traversing the part of the roadway corresponding to geospatial entity 318 may have had mobile device 140 being used within vehicle 326. Mobile device 140 within geospatial entity 318 may provide application use data for use of mapping applications being used for driving directions, ride-hailing applications, in-vehicle entertainment applications, or the like. Similarly, location data may have indicated that mobile device 140 traveling within geospatial entity 318 is traveling at speeds consistent with automobile use. Location data may indicate a heading for mobile device 140 that is in an easterly direction. Location data may indicate that mobile device 140 is located within geospatial entity 318 and not within, for example, geospatial entity 310.

Figure 4:
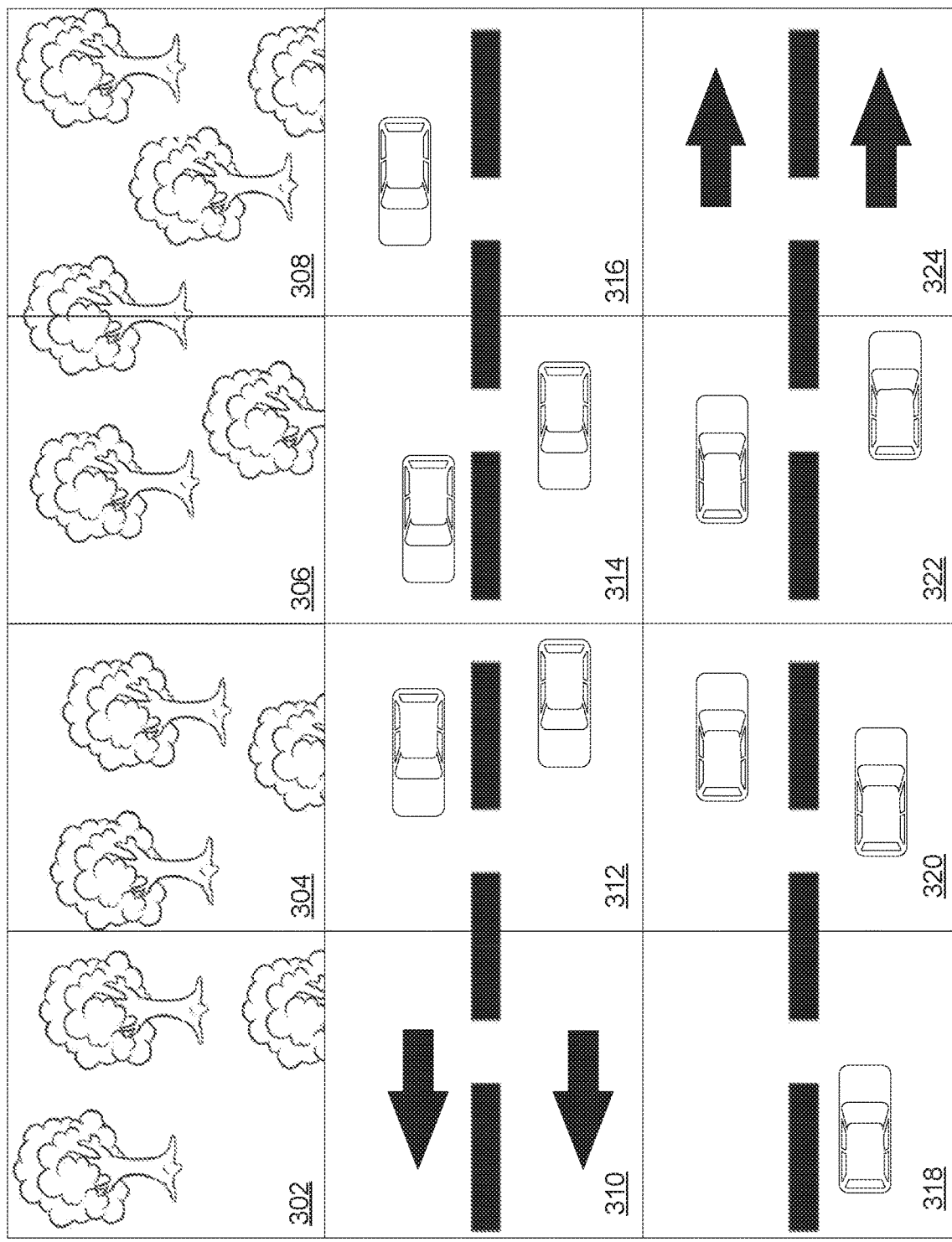
FIG. 4 is a conceptual illustration of the map section of FIG. 3 showing a current view of the map section after recent changes.

FIG. 4 is a conceptual illustration of the map section of FIG. 3 showing another example view of the map section after recent changes. More specifically, currently observed or more recently observed activity data indicates that changes should be made to the map as shown in FIG. 4.

Illustration 400 shows a real-world representation of a map section with an overlay of a set of geospatial entities corresponding to the map section. Each geospatial entity may be associated with an entity identifier. In some embodiments, entity change detection module 118 (shown in FIG. 1) or trend analyzer 210 (shown in FIG. 2) may be configured to subdivide or aggregate together any one of geospatial entities 302, 304, 306, 308, 310, 312, 314, 316, 318, 320, 322, and 324.

As shown, geospatial entities 302, 304, 306, and 308 are associated with a geographic region that shows mostly vegetation. For example, geospatial entities 302, 304, 306, and 308 may correspond to a public park, forest, green belt, sports field, agricultural land, undeveloped land, or the like, similar to that shown in FIG. 3. In contrast to FIG. 3, geospatial entities 310, 312, 314, and 316 are now associated with another roadway, such as a new roadway. Currently observed activity data for geospatial entities 310, 312, 314, and 316 may indicate statistically significant driving activity. For example, a vehicle 330 traversing the part of the roadway corresponding to geospatial entity 312 may have mobile device 140 being used within vehicle 330. Mobile device 140 within geospatial entity 312 may be currently providing application use data for use of mapping applications being used for driving directions, in-vehicle entertainment applications, or the like. Similarly, location data may indicate that mobile device 140 traveling within geospatial entity 330 is traveling at speeds consistent with automobile use. Location data may indicate a heading for mobile device 140 that is in a westerly direction.

Also shown in FIG. 3 are geospatial entities 318, 320, 322, and 324, which may be associated with a roadway. Geospatial entities 318, 320, 322, and 324 show a two-lane roadway heading in an easterly direction. Each of geospatial entities 318, 320, 322, and 324 may be a geospatial entity that represents part of the two-lane roadway shown. In contrast to geospatial entity 310, a geospatial entity such as geospatial entity 318 is likely to have driving activity associated with it.

In an embodiment, trend analyzer 210 (shown in FIG. 2) may be configured to compare activity data received between a time represented by FIG. 3 and a time represented by FIG. 4 for geospatial entities 302, 304, 306, 308, 310, 312, 314, 316, 318, 320, 322, and 324. For geospatial entities 310, 312, 314, and 316, trend analyzer 210 may be configured to determine that these geospatial entities have undergone significant activity change. Accordingly, trend analyzer 210 may be configured to generate trend analysis data 214 and/or trend visualizations 212 to provide to ticket queue 216 in order that the real world changes to geospatial entities 310, 312, 314, and 316 may be applied to map data for these geospatial entities.

Figure 5:
FIG. 5 is a map view showing another map section before recent changes to the real world at that map section.

FIG. 5 is a map view showing another map section before recent changes to the real world at that map section. Map view 500 shows a map section with a subsection 504. In some embodiments, map change management system 218 (shown in FIG. 2) or other map management systems (not shown) may have rendered the map view 500 to indicate subsection 504 as being without roadways.

Moreover, activity data extractor module 114 (shown in FIG. 1) or activity data extractor 206 (shown in FIG. 2) may have detected little or no driving activity within subsection 504. Subsection 504 may indicate other forms of activity. For example, activity data from mobile devices 140 within subsection 504 may include attribute values associated with activity attributes for walking activity and application use activity. More specifically, there may be walking trails within subsection 504. The presence and use of these walking trails may prompt users to use fitness-related mobile applications such that fitness application use data may be transmitted by mobile devices 140 to indicate walking activity. Relatedly, there may be little or no activity data received at all by activity data extractor module 114 (shown in FIG. 1) or activity data extractor 206, suggesting that subsection 504 lies in an area with few or no wireless access points nearby.

Figure 6:
FIG. 6 is a map view showing the map section of FIG. 5 after recent changes to the real world at that map section that are highlighted using a cluster visualization generated by the system of FIG. 1.

FIG. 6 is a map view showing the map section of FIG. 5 after recent changes to the real world at that map section that are highlighted using a cluster visualization generated by the system of FIG. 1.

Map view 600 shows a map section with a subsection 604. Subsection 604 corresponds to subsection 504 (shown in FIG. 5). However, subsection 604 differs from subsection 504 in that subsection 604 now depicts multiple roadways within it, such as road 606. Referring back to the systems and processes outlined with respect to FIGS. 1 and 2, in an embodiment, mobile devices 140 (or mobile device 140) may transmit activity data indicating increased counts for activity attributes associated with driving activity when mobile devices 140 travel within subsection 604.

In some embodiments, trend analyzer 210 (shown in FIG. 2) may be configured to use the activity data to make a number of determinations regarding subsection 604. More specifically, trend analyzer 210 may compare expected activity levels for driving count, for example, for subsection 504 and compare these to currently observed levels for driving count for the same subsection. Trend analyzer 210 may be configured to use precise location determinations from the location data within the transmitted activity data to determine the location, extent, and heading of roads within subsection 604. For example, trend analyzer 210 may analyze the activity data received from mobile devices 140 and determine the location and extent of road 606. Trend analyzer 210 may be configured to detect a sharp drop in walking activity from the decline in fitness application use data being received from mobile devices 140.

Furthermore, in some embodiments, trend analyzer 210 may be configured to generate trend visualizations indicating the increased activity within subsection 604. As described above with respect to FIG. 2, trend analyzer 210 may be configured to cluster together changed geospatial entities that are also geographically proximate to each other. As shown in FIG. 2, trend analyzer 210 clusters geospatial entities within subsection 604 to generate geospatial entity cluster 602. With respect to subsection 604, trend analyzer 210 may detect that each geospatial entity within subsection 604 has undergone significant changes in activity. For example, each geospatial entity in subsection 604 may exhibit increased driving activity, decreased walking activity, and/or similar changes in application use. Trend analyzer 210 may be configured to cluster each geospatial entity in subsection 604 and identify the cluster as a significant activity change cluster. As described above with respect to FIG. 2, trend analyzer 210 may provide this cluster as trend visualization 212 to ticket queue 216. The provided cluster may be used by map change management system 218 to update the map data for subsection 504 so that it reflects the new roadways (such as road 606) that are depicted with respect to subsection 604. Subsection 604 may be presented in a highlighted or emphasized way to draw a viewer's attention to the area of significant activity change.

Example Processes

To enable the reader to obtain a clear understanding of the technological concepts described herein, the following processes describe specific steps performed in a specific order. However, one or more of the steps of a particular process may be rearranged and/or omitted while remaining within the contemplated scope of the technology disclosed herein. Moreover, different processes, and/or steps thereof, may be combined, recombined, rearranged, omitted, and/or executed in parallel to create different process flows that are also within the contemplated scope of the technology disclosed herein. Additionally, while the processes below may omit or briefly summarize some of the details of the technologies disclosed herein for clarity, the details described in the paragraphs above may be combined with the process steps described below to get a more complete and comprehensive understanding of these processes and the technologies disclosed herein.

Figure 7:
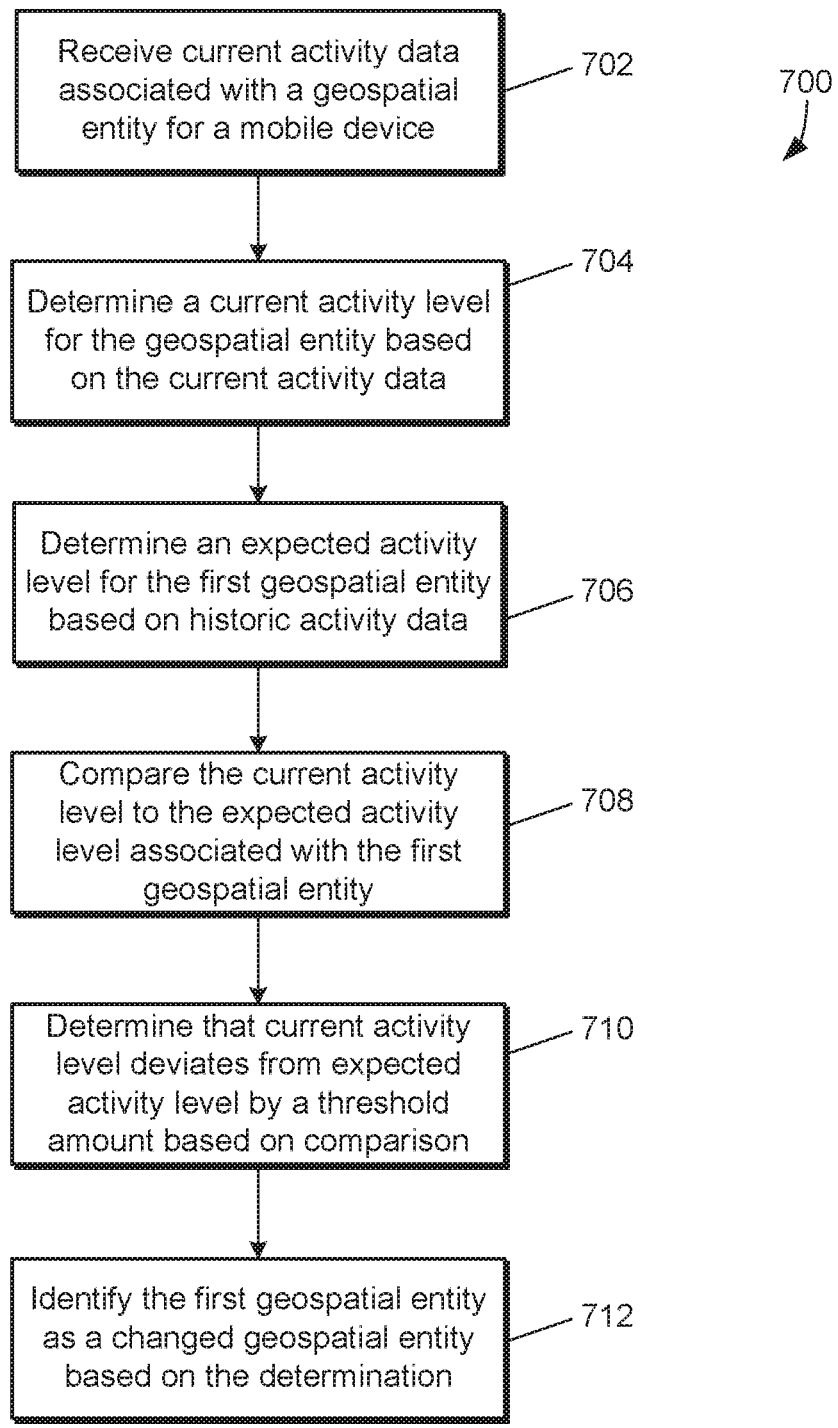
FIG. 7 is flow diagram of an example process for active change detection for geospatial entities using trend analysis.

FIG. 7 is a flow diagram of an example process for active change detection for geospatial entities using trend analysis. For example, process 700 can be performed by a computing device (e.g., server device 110).

At step 702, the computing device receives current activity data for a mobile device. For example, the computing device may receive activity data 102 (shown in FIG. 2) from mobile device 140 (shown in FIG. 2) (or one of mobile devices 140 shown in FIG. 1). As described above with respect to FIGS. 1 and 2, the current activity data may include currently observed activity levels for several activity data measures (e.g., driving counts, walking counts, application use, Wi-Fi access locations/times). The current activity data may include location data indicating a current location of the mobile device. The computing device may be configured to store the activity data in a storage (e.g., entity data store 212, shown in FIG. 2).

Moreover, in some embodiments, the computing device may be configured to associate the location data for the mobile device location with a particular geospatial entity. As described above with respect to FIGS. 1-4, the computing device may subdivide a geographic region (or map section) into a number of geospatial entities. For example, each region may be converted into a map representation (which may be simply data values rather than images) composed of equally sized geospatial entities. Each geospatial entity may have a unique geospatial entity identifier as well as an associated location data. For example, each geospatial entity may be a square, with some or all of the vertices of the square being represented as geographic coordinates (e.g., latitude and longitude values). Accordingly, computing device may be configured to correlate the location data for the mobile device with the corresponding location data for a geospatial entity and associate the mobile device activity with that geospatial entity. As a result, the computing device may associate some or all of the currently observed activity taking place within the location of the geospatial entity with that particular geospatial entity. For example, an instance of driving activity for a road segment given by the geospatial entity may be associated with the geospatial entity within entity data store 212.

At step 704, the computing device may determine a current activity level for the geospatial entity based on the current activity data. More specifically, this current activity level may be associated to the geospatial entity. In an embodiment, this current activity level may be a statistical value (e.g., a mean application launch count for a particular application at a geospatial entity). As indicated above, the currently observed activity occurring within the geospatial entity's location may be associated to the geospatial entity.

In some embodiments, the current activity level determined at step 704 may be aggregated (as by aggregator module 116) to the geospatial entity. Aggregated current activity may represent, for example, a day's worth of driving counts for the geospatial entity, such as where the geospatial entity corresponds to a road segment.

At step 706, the computing device determines an expected activity level for the first geospatial entity based on historic activity data. The expected activity level may be determined using aggregated attribute values for various activity attributes over periods of time. Moreover, each activity data attribute may be associated to a geospatial entity. Accordingly, the expected activity levels of activity for an activity data attribute may be determined from the aggregated attribute values for that activity data attribute associated with the geospatial entity. In some embodiments, expected activity levels are generated for each activity attribute of a geospatial entity. Expected activity levels may be generated for each activity attribute regardless of the underlying geography associated with the geospatial entity.

At step 708, the computing device compares the current activity level to the corresponding expected activity level associated with the geospatial entity. Expected activity may be aggregated using particular dates, as described above with respect to FIG. 1. This expected activity may be of a corresponding period to the aggregated current activity (e.g., a day) or may be of a longer or shorter time period. Regardless of time period, the computing device may be configured to calculate various statistical values from the expected activity level, such as a mean, median, standard deviation, percentile distribution, or the like. For example, the computing device may be configured to compare a mean expected driving count to a mean currently observed driving count. The computing device may retrieve expected activity from a prior time of day, prior day of the week, prior day of a month, particular holiday, or the like.

At step 710, the computing device may be configured to determine that the current activity level deviates from the expected activity level by a threshold amount, based on the comparison. As described above with respect to FIGS. 1 and 2, the computing device may set a threshold level for the difference or other deviation between the expected activity level and the currently observed activity level for a particular activity attribute. The computing device may be configured to test the deviation against the threshold level and determine that the current activity level deviates from the expected activity level by at least the threshold.

Based on the determination at step 710, at step 712 the computing device identifies the geospatial entity as a changed geospatial entity. The computing device may update a data value for the geospatial entity to tag it as indicating significant activity change. The computing device may provide an identifier for the geospatial entity in a list of changed geospatial entities, or indicate in some other way in ticket queue 216 that the geospatial entity is currently experiencing a high change in activity. Map change management system 218 (shown in FIG. 2) may be configured to consume the ticket for the geospatial entity and enact changes to map data corresponding to the type and degree of activity change indicated by the computing device.

Graphical User Interfaces

This disclosure above describes various Graphical User Interfaces (GUIs) for implementing various features, processes or workflows. These GUIs can be presented on a variety of electronic devices including but not limited to laptop computers, desktop computers, computer terminals, television systems, tablet computers, e-book readers and smart phones. One or more of these electronic devices can include a touch-sensitive surface. The touch-sensitive surface can process multiple simultaneous points of input, including processing data related to the pressure, degree or position of each point of input. Such processing can facilitate gestures with multiple fingers, including pinching and swiping.

When the disclosure refers to "select" or "selecting" user interface elements in a GUI, these terms are understood to include clicking or "hovering" with a mouse or other input device over a user interface element, or touching, tapping or gesturing with one or more fingers or stylus on a user interface element. User interface elements can be virtual buttons, menus, selectors, switches, sliders, scrubbers, knobs, thumbnails, links, icons, radio buttons, checkboxes and any other mechanism for receiving input from, or providing feedback to a user.

Privacy

As described above, one aspect of the present technology is the gathering and use of data available from various sources to perform functions for active change detection for geospatial entities using trend analysis. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to actively detect changes in geospatial entities using trend analysis. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of active change detection for geospatial entities using trend analysis, the present technology can be configured to allow users to select to "opt in" or "opt out" of participation in the collection of personal information data during registration for services or anytime thereafter. In another example, users can select not to provide location data for active change detection for geospatial entities using trend analysis. In yet another example, users can select to limit the length of time location data is maintained or entirely prohibit the development of location data for active change detection for geospatial entities using trend analysis. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, active change detection for geospatial entities may be performed based on non-personal information data or a bare minimum amount of personal information, such as the content being requested by the device associated with a user, other non-personal information available to the active change detection system, or publicly available information.

Example System Architecture

Figure 8:
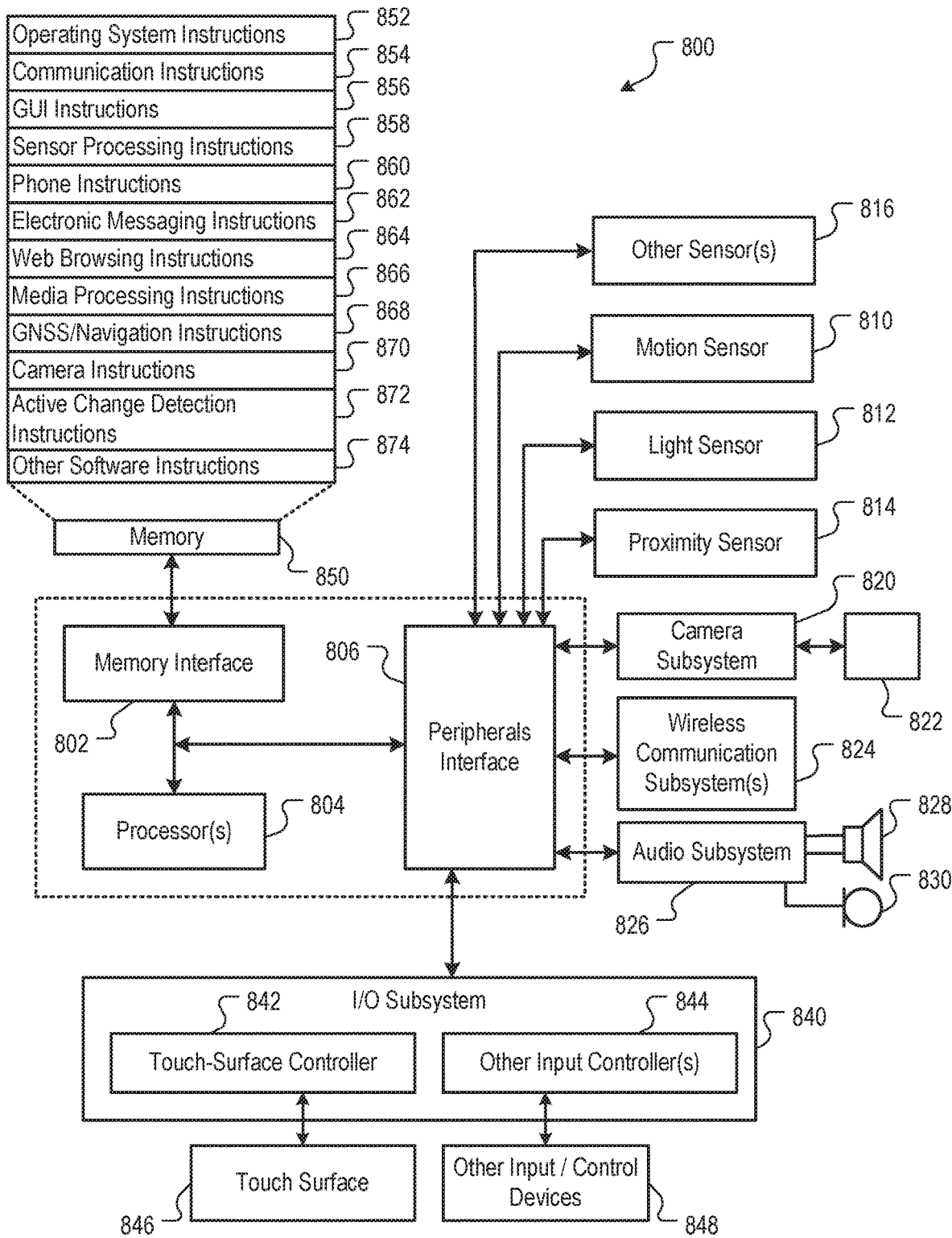
FIG. 8 is a block diagram of an example computing device that can implement the features and processes of FIGS. 1-7.

FIG. 8 is a block diagram of an example computing device 800 that can implement the features and processes of FIGS. 1-7. The computing device 800 can include a memory interface 802, one or more data processors, image processors and/or central processing units 804, and a peripherals interface 806. The memory interface 802, the one or more processors 804 and/or the peripherals interface 806 can be separate components or can be integrated in one or more integrated circuits. The various components in the computing device 800 can be coupled by one or more communication buses or signal lines.

Sensors, devices, and subsystems can be coupled to the peripherals interface 806 to facilitate multiple functionalities. For example, a motion sensor 810, a light sensor 812, and a proximity sensor 814 can be coupled to the peripherals interface 806 to facilitate orientation, lighting, and proximity functions. Other sensors 816 can also be connected to the peripherals interface 806, such as a global navigation satellite system (GNSS) (e.g., GPS receiver), a temperature sensor, a biometric sensor, magnetometer or other sensing device, to facilitate related functionalities.

A camera subsystem 820 and an optical sensor 822, e.g., a charged coupled device (CCD) or a complementary metal-oxide semiconductor (CMOS) optical sensor, can be utilized to facilitate camera functions, such as recording photographs and video clips. The camera subsystem 820 and the optical sensor 822 can be used to collect images of a user to be used during authentication of a user, e.g., by performing facial recognition analysis.

Communication functions can be facilitated through one or more wireless communication subsystems 824, which can include radio frequency receivers and transmitters and/or optical (e.g., infrared) receivers and transmitters. The specific design and implementation of the communication subsystem 824 can depend on the communication network(s) over which the computing device 800 is intended to operate. For example, the computing device 800 can include communication subsystems 824 designed to operate over a GSM network, a GPRS network, an EDGE network, a Wi-Fi or WiMax network, and a Bluetooth™ network. In particular, the wireless communication subsystems 824 can include hosting protocols such that the device 100 can be configured as a base station for other wireless devices.

An audio subsystem 826 can be coupled to a speaker 828 and a microphone 830 to facilitate voice-enabled functions, such as speaker recognition, voice replication, digital recording, and telephony functions. The audio subsystem 826 can be configured to facilitate processing voice commands, voiceprinting and voice authentication, for example.

The I/O subsystem 840 can include a touch-surface controller 842 and/or other input controller(s) 844. The touch-surface controller 842 can be coupled to a touch surface 846. The touch surface 846 and touch-surface controller 842 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch surface 846.

The other input controller(s) 844 can be coupled to other input/control devices 848, such as one or more buttons, rocker switches, thumb-wheel, infrared port, USB port, and/or a pointer device such as a stylus. The one or more buttons (not shown) can include an up/down button for volume control of the speaker 828 and/or the microphone 830.

In one implementation, a pressing of the button for a first duration can disengage a lock of the touch surface 846; and a pressing of the button for a second duration that is longer than the first duration can turn power to the computing device 800 on or off. Pressing the button for a third duration can activate a voice control, or voice command, module that enables the user to speak commands into the microphone 830 to cause the device to execute the spoken command. The user can customize a functionality of one or more of the buttons. The touch surface 846 can, for example, also be used to implement virtual or soft buttons and/or a keyboard.

In some implementations, the computing device 800 can present recorded audio and/or video files, such as MP3, AAC, and MPEG files. In some implementations, the computing device 800 can include the functionality of an MP3 player, such as an iPod™.

The memory interface 802 can be coupled to memory 850. The memory 850 can include high-speed random-access memory and/or non-volatile memory, such as one or more magnetic disk storage devices, one or more optical storage devices, and/or flash memory (e.g., NAND, NOR). The memory 850 can store an operating system 852, such as Darwin, RTXC, LINUX, UNIX, OS X, WINDOWS, or an embedded operating system such as VxWorks.

The operating system 852 can include instructions for handling basic system services and for performing hardware dependent tasks. In some implementations, the operating system 852 can be a kernel (e.g., UNIX kernel). In some implementations, the operating system 852 can include instructions for performing voice authentication. For example, operating system 852 can implement the features for active change detection for geospatial entities as described with reference to FIGS. 1-7.

The memory 850 can also store communication instructions 854 to facilitate communicating with one or more additional devices, one or more computers and/or one or more servers. The memory 850 can include graphical user interface instructions 856 to facilitate graphic user interface processing; sensor processing instructions 858 to facilitate sensor-related processing and functions; phone instructions 860 to facilitate phone-related processes and functions; electronic messaging instructions 862 to facilitate electronic-messaging related processes and functions; web browsing instructions 864 to facilitate web browsing-related processes and functions; media processing instructions 866 to facilitate media processing-related processes and functions; GNSS/Navigation instructions 868 to facilitate GNSS and navigation-related processes and instructions; and/or camera instructions 870 to facilitate camera-related processes and functions.

The memory 850 can store software instructions 872 to facilitate other processes and functions, such as the processes and functions for active change detection for geospatial entities as described with reference to FIGS. 1-7.

The memory 850 can also store other software instructions 874, such as web video instructions to facilitate web video-related processes and functions; and/or web shopping instructions to facilitate web shopping-related processes and functions. In some implementations, the media processing instructions 866 are divided into audio processing instructions and video processing instructions to facilitate audio processing-related processes and functions and video processing-related processes and functions, respectively.

Each of the above identified instructions and applications can correspond to a set of instructions for performing one or more functions described above. These instructions need not be implemented as separate software programs, procedures, or modules. The memory 850 can include additional instructions or fewer instructions. Furthermore, various functions of the computing device 800 can be implemented in hardware and/or in software, including in one or more signal processing and/or application specific integrated circuits.

What is claimed is:

1. A method of active change detection for geospatial entities, the method implemented by a computing device that includes one or more processors and a memory device, the method comprising:
   storing, in the memory device, map data including a first geospatial entity corresponding to a first map area that includes a first physical map feature;
   receiving, by a computing device, current activity data for a mobile device, the activity data being associated with the first physical map feature;
   determining one or more current activity levels for one or more activity data attributes associated with the first physical map feature based on the current activity data;
   determining one or more expected activity levels for the one or more activity data attributes associated with the first physical map feature based on historic activity data;
   comparing the current activity level to the expected activity level associated with the first physical map feature;
   determining that the one or more current activity levels for the first physical map feature deviate from the corresponding one or more expected activity levels for the first physical map feature by at least a threshold amount;
   responsive to the determination, determining that the first physical map feature has changed; and
   providing an identifier of the first geospatial entity to a map change management system to cause an update to the first geospatial entity.

2. The method of claim 1, further comprising:
   determining that the one or more current activity levels deviate from the corresponding one or more expected activity levels by at least the threshold amount for a second physical map feature, the second physical map feature associated with a second map area that is represented by a second geospatial entity in the map data;
   determining that the second map area is geographically proximate to the first map area;

generating a high activity geospatial cluster that includes the first geospatial entity and the second geospatial entity; and providing the high activity geospatial cluster to a map change management system to update a visual representation of the first geospatial entity on a map display.

3. The method of claim 1, wherein the current activity data includes a plurality of location points for the mobile device representing location information for the mobile device, further comprising:

classifying the current activity data by the one or more activity data attributes, wherein the one or more activity data attributes include one or more of a driving activity data attribute, a walking activity data attribute, a heading activity data attribute, and an application usage activity data attribute.

4. The method of claim 3, further comprising:

aggregating the current activity data and the historic activity data based on the one or more activity data attributes; and determining an attribute-based current activity level and attribute-based historic activity level for each attribute of the one or more activity data attributes.

5. The method of claim 1, wherein the current activity data includes application usage data for one or more applications executing on the mobile device, further comprising:

selecting an application action instance within the application usage data, wherein the application action instance corresponds to one of an application launch action, an application download action, an application usage action, an application deletion action, and an application update action;

identifying an application category for the application action instance; and aggregating the application action instance with at least one other application action instance of the application category.

6. The method of claim 1, further comprising:

identifying, based on the current activity data, a first activity level for a first attribute and a second activity level for a second attribute; and generating a composite activity level by combining the first activity level with the second activity level.

7. The method of claim 1, further comprising:

selecting a geographic identifier for the first geospatial entity, wherein the geographic identifier includes a set of geographic coordinates for the first geospatial entity;

converting the geographic identifier to a geographic hash value; and associating the geographic hash value to the first geospatial entity.

8. The method of claim 1, further comprising:

identifying a first time window and a second time window, the first time window being longer than the second time window;

aggregating the current activity data according to the first time window;

detecting a first activity change for the geospatial entity within the first time window;

aggregating the current activity data according to the second time window; and detecting a second activity change for the geospatial entity within the second time window, wherein the second activity change is a subset of the first activity change.

9. The method of claim 1, wherein the first physical map feature included in the first geospatial entity corresponds to a road that includes one or more of a road segment, and a road intersection.

10. A non-transitory computer-readable medium including one or more sequences of instructions that, when executed by one or more processors, cause the processors to perform operations comprising:

storing, in a memory device, map data including a first geospatial entity corresponding to a first map area that includes a first physical map feature;

receiving, by a computing device, current activity data for a mobile device, the activity data being associated with the first physical map feature;

determining one or more current activity levels for one or more activity data attributes associated with the first physical map feature based on the current activity data;

determining one or more expected activity levels for the one or more activity data attributes associated with the first physical map feature based on historic activity data;

comparing the current activity level to the expected activity level associated with the first physical map feature;

determining that the one or more current activity levels for the first physical map feature deviate from the corresponding one or more expected activity levels for the first physical map feature by at least a threshold amount;

responsive to the determination, determining that the first physical map feature has changed; and providing an identifier of the first geospatial entity to a map change management system to cause an update to the first geospatial entity.

11. The non-transitory computer readable medium of claim 10, wherein the instructions cause:

determining that the one or more current activity levels deviate from the corresponding one or more expected activity levels by at least the threshold amount for a second physical map feature, the second physical map feature associated with a second map area that is represented by a second geospatial entity in the map data;

determining that the second map area is geographically proximate to the first map area;

generating a high activity geospatial cluster that includes the first geospatial entity and the second geospatial entity; and providing the high activity geospatial cluster to a map change management system to update a visual representation of the first geospatial entity on a map display.

12. The non-transitory computer readable medium of claim 10, wherein the current activity data includes a plurality of location points for the mobile device representing location information for the mobile device, and wherein the instructions cause:

classifying the current activity data by the one or more activity data attributes, wherein the one or more activity data attributes include one or more of a driving activity data attribute, a walking activity data attribute, a heading activity data attribute, and an application usage activity data attribute.

13. The non-transitory computer readable medium of claim 10, wherein the activity data includes application usage data for one or more applications executing on the mobile device and wherein the instructions cause:

selecting an application action instance within the application usage data, wherein the application action instance corresponds to one of an application launch action, an application download action, an application usage action, an application deletion action, and an application update action;

identifying an application category for the application action instance; and aggregating the application action instance with at least one other application action instance of the application category.

14. The non-transitory computer readable medium of claim 10, wherein the instructions cause:

selecting a geographic identifier for the first geospatial entity, wherein the geographic identifier includes a set of geographic coordinates for the first geospatial entity;

converting the geographic identifier to a geographic hash value; and associating the geographic hash value to the first geospatial entity.

15. A system comprising:

one or more processors; and a non-transitory computer-readable medium including one or more sequences of instructions that, when executed by one or more processors, cause the processors to perform operations comprising:

storing, in a memory device, map data including a first geospatial entity corresponding to a first map area that includes a first physical map feature;

receiving, by a computing device, current activity data for a mobile device, the activity data being associated with the first physical map feature;

determining one or more current activity levels for one or more activity data attributes associated with the first physical map feature based on the current activity data;

determining one or more expected activity levels for the one or more activity data attributes associated with the first physical map feature based on historic activity data;

comparing the current activity level to the expected activity level associated with the first physical map feature;

determining that the one or more current activity levels for the first physical map feature deviate from the corresponding one or more expected activity levels for the first physical map feature by at least a threshold amount;

responsive to the determination, determining that the first physical map feature has changed; and providing an identifier of the first geospatial entity to a map change management system to cause an update to the first geospatial entity.

16. The system of claim 15, wherein the instructions cause:

determining that the one or more current activity levels deviate from the corresponding one or more expected activity levels by at least the threshold amount for a second physical map feature, the second physical map feature associated with a second map area that is represented by a second geospatial entity in the map data;

determining that the second map area is geographically proximate to the first map area;

generating a high activity geospatial cluster that includes the first geospatial entity and the second geospatial entity; and providing the high activity geospatial cluster to a map change management system to update a visual representation of the first geospatial entity on a map display.

17. The system of claim 15, wherein the instructions cause:

identifying a confidence interval for the current activity data;

identifying at least one location point that exists outside the confidence interval; and filtering the current activity data to remove the at least one location point.

18. The system of claim 15, wherein the instructions cause:

classifying the current activity data by the one or more activity data attributes, wherein the one or more activity data attributes include one or more of a driving activity data attribute, a walking activity data attribute, a heading activity data attribute, and an application usage activity data attribute.

19. The system of claim 15, wherein the instructions cause:

selecting an application action instance within the application usage data, wherein the application action instance corresponds to one of an application launch action, an application download action, an application usage action, an application deletion action, and an application update action;

identifying an application category for the application action instance; and aggregating the application action instance with at least one other application action instance of the application category.

20. The system of claim 15, wherein the instructions cause:

identifying, based on the current activity data, a first activity level for a first attribute and a second activity level for a second attribute; and generating a composite activity level by combining the first activity level with the second activity level.

21. The method of claim 1, wherein the current activity data indicates a traversal of the first physical map feature by the mobile device, further comprising:

storing a traversal statistic associated with the first geospatial entity, the traversal statistic representing a quantity of traversals across the first physical map feature;

receiving the current activity data that includes traversal data for the traversal of the physical map feature by the mobile device;

updating, for the physical map feature, the traversal statistic in the map data; and determining that the first physical map feature has changed based on the updated traversal statistic in the map data for the first physical map feature.

* * * * *